United States Patent [19]

Subramanian

[11] Patent Number: 4,804,703

[45] Date of Patent: Feb. 14, 1989

[54] MINERAL REINFORCED NYLON COMPOSITIONS FOR BLOWMOLDING

[75] Inventor: Pallatheri M. Subramanian, Wilmington, Del.

[73] Assignee: E. I. Du Pont de Nemours and Company, Wilmington, Del.

[21] Appl. No.: 98,940

[22] Filed: Sep. 21, 1987

Related U.S. Application Data

[63] Continuation-in-part of Ser. No. 73,222, Jul. 12, 1987, abandoned.

[51] Int. Cl.[4] .................. C08L 33/02; C08L 77/00
[52] U.S. Cl. ..................... 524/444; 524/445; 524/514; 525/179; 525/183
[58] Field of Search ............. 524/444, 445, 514; 525/179, 183

[56] References Cited

U.S. PATENT DOCUMENTS

| | | | |
|---|---|---|---|
| 2,975,128 | 3/1961 | Stott | 252/12 |
| 3,005,795 | 10/1961 | Busse | 525/178 |
| 3,846,367 | 11/1974 | Burton | 260/37 N |
| 3,879,301 | 4/1975 | Cairns | 252/12 |
| 3,994,814 | 11/1976 | Cairns | 252/12.6 |
| 4,159,286 | 6/1979 | Khattab et al. | 260/857 |
| 4,314,929 | 2/1982 | Mahoney | 524/444 |
| 4,404,325 | 9/1983 | Mason | 525/179 |
| 4,478,978 | 10/1984 | Roura | 525/183 |
| 4,491,553 | 1/1985 | Yamada et al. | 264/51 |
| 4,500,603 | 2/1985 | Freundlich | 428/409 |

Primary Examiner—John C. Bleutge
Assistant Examiner—David Buttner

[57] ABSTRACT

It has now been found that a unique combination of additives makes mineral-reinforced semi-crystalline polyamides readily processible by extrusion blowmolding to make hollow, stiff parts of various shapes. The compositions consist essentially of semicrystalline polyamide, 15–50 weight percent mineral filler reinforcing agent; 1–25 weight percent of an ionic copolymer of at least one alpha-olefin and at least one alpha, beta-unsaturated carboxylic acid in which the acid moiety is partially neutralized with metal ions, and 0.1 to 3 weight percent of fibrillar fluoropolymer resin. Percents are by weight of compositions.

4 Claims, No Drawings

MINERAL REINFORCED NYLON COMPOSITIONS FOR BLOWMOLDING

CROSS REFERENCE TO RELATED APPLICATIONS

This application is a continuation in part of application Ser. No. 073,222 filed about July 12, 1987, now abandoned.

BACKGROUND OF THE INVENTION

Polyamides that are semicrystalline are used extensively in applications that require good solvent resistance and good properties at elevated temperatures. Additionally, they are suitable for modification by reinforcing with inorganic fillers and fibers (minerals) which enhance stiffness and high temperature properties. Such reinforced polyamides are widely used as an engineering plastic molding material suitable for many applications such as automobile parts. They are ordinarily processed by injection molding, but there are many components of automobiles and other systems wherein such parts are required to be hollow, and to manufacture these by injection molding is very difficult and expensive. Many such parts can conceivably be made by blowmolding provided the polymer system has adequate melt strength and viscosity. Unfortunately, polyamides commonly used for injection molding have number average molecular weights generally between 10,000 and 25,000, which is too low to make them suitable for extrusion blowmolding. Mineral reinforced semicrystalline polyamide compositions that are available commercially, and which are described in prior art such as U.S. Pat. No. 3,846,367, have good toughness but suffer from low viscosity and low melt strength, which makes these compositions unsuitable for processing by blowmolding.

Combinations of small amounts of metal neutralized ethylene acid copolymers; e.g., "Surlyn" ionomer, with mineral reinforced polyamides have been reported to give improved surfaces on molding (U.S. Pat. No. 4,314,929). Many prior art patents claim or disclose addition of various amounts of fluoropolymer to nylon for enhancement of properties, e.g., high gloss (U.S. Pat. Nos. 4,500,603A) and wear resistance (3,879,301; 3,994,814; 2,975,128; 4,159,286). U.S. Pat. No. 3,005,795 claims addition of 0.05-20 weight percent fibrillar fluoropolymer improves the extrusion and thermoformabilities of thermoplastic resins. U.S. Pat. No. 4,491,553 discloses an improved process for making mineral filled thermoplastics in a two-step process by compounding the ingredients containing fibrillar polymer (0.01-5%) under shear without total melting, to be followed by a second step involving total melting of the thermoplastic. None of these disclose or teach the right combination of additives used with the usual injection moldable semicrystalline polyamides to result in unexpected rheological properties which make the compositions amenable to extrusion blowmolding.

SUMMARY OF THE INVENTION

It has now been found that a unique combination of additives makes mineral-reinforced semicrystalline polyamides readily processible by extrusion blowmolding to make hollow, stiff parts of various shapes.

The compositions consist essentially of semicrystalline polyamide of number average molecular weight between 10,000 and 25,000, 15-50 weight percent mineral filler reinforcing agent, 1-25% weight percent of an ionic copolymer of at least one alpha-olefin and at least one alpha,beta-unsaturated carboxylic acid in which the acid moiety is partially neutralized with metal ions, and 0.1 to 3 weight percent of fibrillar fluoropolymer resin. Percents are by weight of compositions.

These compositions have high melt strength compared to the base polyamide. These properties aid in making the compositions blow-moldable.

DETAILED DESCRIPTION OF THE INVENTION

The polyamide matrix resin of the toughened compositions of this invention is well known in the art and embraces those semi-crystalline resins having a molecular weight of between 10,000 and 25,000 and commonly referred to as nylons. These are considered to be injection moldable. Polyamides of molecular weights over 25,000 are not normally considered to be good injection moldable polyamides because of their high viscosity. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), the polyamide produced by ring opening of lactams, i.e., polycaprolactam, polylauric lactam, poly-11-aminoundecanoic acid, bis(paraaminocyclohexyl) methane dodecanoamide. It is also possible to use in this invention polyamides prepared by the copolymerization of two of the above polymers or terpolymerization of the above polymers or their components; e.g, an adipic, isophthalic acid hexamethylene diamine copolymer. Preferably the polyamides are linear with a melting point in excess of 200° C. By "semicrystalline is meant that the polyamide has a distinct melting point with a measurable heat of fusion, as described in U.S. Pat. No. 4,410,661 in Columns 1 and 2.

The mineral filler reinforcing agent can be any of those conventionally used in the prior art; namely, any reinforcing material containing minerals, and may be in the form of a particulate reinforcing filler or in the form of fiber reinforcing filler. The particulate will have a length to diameter ratio of about 2:1. The fiber can have a much larger length to diameter ratio; for example, from about 10:1 to 50:1. The reinforcing filler may be treated with a coupling agent to provide a capability for adherent bonding of filler to polyamide.

The presence of a coupling agent is helpful to effectively bond the mineral to the nylon. Suitable coupling agents are known in the prior art, for example, U.S. Pat. No. 3,290,165 discloses using gamma aminopropyltrialkoxysilane as a coupling agent. Epoxysilanes and vinyl silanes may also be employed. The amount of silane coupling agent needed in order to insure a good bond between the reinforcing agent and the nylon is about 0.25 to 2 percent by weight, based upon the weight of the mineral. The silane compound may be coated directly on the reinforcing material prior to inclusion of the reinforcing material in the nylon, or the silane compound may be coated on the nylon or added to the nylon at the same time the reinforcing material is added. Specific reinforcing materials found particularly useful are particulate silica having a length to diameter ratio of about 2:1 and alkaline earth silicates such as calcium silicate in the form of wollastonite. Fibrous reinforcing minerals include glass fibers and fibrous wollastonite (a form of calcium silicate). Preferably, the minerals employed have a particle size such that 90 percent by weight or more are less than 15 microns and that the average particle size is in the range of 1 to 8 microns. Preferably, 98 percent of the particles are less than 10 microns and have an average particle size between 1 and 6 microns. The silcate fillers disclosed in U.S. Pat. No. 3,419,517 can be used in this invention. Mixtures of mineral fillers can also be employed.

Mineral fillers include amorphous silica, asbestos, aluminum silicate, magnesium carbonate, kaolin, chalk, powdered quartz, mica, feldspar, clay, glass; e.g. aluminum silicate clay, and the like.

The ionic copolymer is made of recurring units of at least one alpha-olefin and at least one alpha,beta-unsaturated carboxylic acid, in which the acid moiety is at least partially ionized with metal ions. The alpha-olefin is preferably of 2-6 carbon atoms and the acid is preferably of 3-6 carbon atoms. Preferably the alpha-olefin is ethylene and the acid is acrylic or methacrylic acid. Other polymerizable comonomers can be present, such as acrylates or methacrylates. The metal ion can be monovalent, divalent or trivalent, as for example Na, Zn, Al, K and the like. Representative copolymers include ethylene/isobutylacrylate/methacrylic acid (80/10/10) 70% zinc neutralized.

The fibrillar fluoropolymer resin is preferably a non-melt-fabricable tetrafluoroethylene polymer. The tetrafluoroethylene polymers are made by the dispersion polymerization process, in which the polymer particles formed remain dispersed in the reaction mix during the polymerization. The particles are coagulated and dried. The particles fibrillate while being physically mixed into the composition of the invention.

The fibrillatable PTFE is a well known material in the art and readily available as a commercial product. The commercially available fibrillatable PTFE is in the form of an aqueous dispersion prepared by the emulsion polymerization or in the form of a powder obtained by separation of the resin from the aqueous dispersion followed by drying. The aqueous dispersion of the fibrillatable PTFE contains usually several tens of %, say, up to 60% of the PTFE particles having a diameter of about 0.2 m while the powdery products are agglomerates of these particles of about 0.5 mm average diameter. The PTFE particles of either form can be readily converted into fibrils when the particles are subjected to mechanical shearing forces.

Several of the examples of the commercially available fibrillatable PTFE are as follows: Teflon 6J (a product by Mitsui Fluorochemical Co.), Teflon 6JC (a product by the same company), Polyflon F-103 (a product of Daikin Kogyo Co.) and Polyflon F-201 (a product by the same company) as the examples of the powdery products and Teflon 30-J (a product by Mitsui Fluorochemcial Co.) and Polyflons D-1 and D-2 (products by Diakin Kogyo Co.) as the examples of the aqueous dispersion products.

The ingredients can be mixed in any order by blending them in an extrusion machine, such as a twin screw extruder.

EXAMPLES

In these examples the polyamide used was a mixture of nylon 66 and nylon 6 having a number average molecular weight of about 18,000. The mixture was compounded with mineral fillers as described in U.S. Pat. No. 3,846,367. Clay was used as the reinforcing mineral filler with conventional coupling agents such as silanes to provide reinforcement. The clay was "satintone," an aluminum silicate. Such products are available commercially. These materials are further compounded with various amounts of the ionomeric copolymer and small amounts of a highly fibrillatable nonmelt-processible tetrafluoroethylene (e.g., "Teflon" 6C, or "Teflon" 60 fluoropolymer) in a melt reactor (e.g., a 28 mm screw extruder manufactured by Werner and Pfleiderer) and the melt extruded into strands, cut, and dried to remove moisture. These pellets, as well as prior art mineral filled compositions, were evaluated for their blowmoldability, as well as rheological properties.

The blowmolding was done using an extrusion blowmolding machine manufactured by Rocheleau Tool and Die Co., Fitchburg, Mass., USA, and a 1 liter container mold.

Number average molecular weight was determined using Waters 150C gel permeation chromatography equipment at 110° C. with meta-cresol as a solvent.

Melt viscosity was measured on a melt capillary rheometer made by Kayeness Test Instrument.

COMPARATIVE EXAMPLE 1

Mineral reinforced nylon ("Minlon" 11C-40, 44.5 parts nylon 66, 14.8 parts nylon 6, 40 parts of the clay mineral filler,and 0.7 parts stabilizer) was attempted to be blowmolded. The extrudate did not have adequate strength to blow mold.

COMPARATIVE EXAMPLE 2

The above-mentioned "Minlon" 11C-40 was melt compounded with 10% weight percent of a copolymer of ethylene (90%) and methacrylic acid (10%) neutralized (70%) with zinc ion (Surlyn ® 9520) using a twin screw 28 mm extruder (manufactured by Werner and Pfleiderer). The resulting strand was cooled and cut into pellets, which were dried. On blowmolding, the extrudate appeared to look slightly better than Comparative Example 1, but no bottles could be blown.

COMPARATIVE EXAMPLE 3 AND 4

"Minlon" 11C-40 was compounded with 1% "Teflon" 6C, a high molecular weight non-melt-fabricable fluoropolymer prepared by the dispersion polymerization process (made by Du Pont) which is known to fibrillate under extrusion conditions. The compounded material was cut into pellets, and were attempted to be blowmolded. Again the melt did not have enough strength to be blowmolded.

In another experiment, non-melt-fabricable "Teflon" 60 was used instead of "Teflon" 6C; it could not be blowmolded.

EXAMPLES 1 AND 2

In these experiments the mineral reinforced nylon ("Minlon" 11C-40) was melt compounded with 10% "Surlyn" 9520 and 1% "Teflon" 6C and the compounded product was isolated as pellets and dried. These pellets were fed into the blowmolding machine. The extrudate showed good strength and 1 liter bottles could be blowmolded readily.

In another experiment, "Teflon" 60 was used instead of "Teflon" 6C This also could be blowmolded readily.

EXAMPLES 3-6 AND COMPARATIVE EXAMPLE A-E

In these examples and comparisons, the ingredients listed in Table I were melt compounded and the resulting materials fed into the blowmolding machine.

TABLE I

MODIFIED MINERAL REINFORCED NYLON
(Numbers are weight percents)

| Example | Minlon 11C-40 | Surlyn[1] 1554 | Teflon 6C | Teflon 60 | Viscosity @ 6 sec$^{-1}$ | Viscosity @ 587 sec$^{-1}$ |
|---|---|---|---|---|---|---|
| A | 100 | — | — | — | 1913 | 465 |
| B | 99 | — | 1 | — | 4485 | 480 |
| C | 99 | — | — | 1 | 3722 | 519 |
| D | 90 | 10 | — | — | 5726 | 525 |
| 3 | 89 | 10 | 1 | — | 6834 | 597 |
| 4 | 89 | 10 | — | 1 | 6847 | 639 |
| E | 80 | 20 | — | — | 6847 | 495 |
| 5 | 79 | 20 | 1 | — | 7146 | 547 |
| 6 | 79 | 20 | — | 1 | 7520 | 594 |

[1] A copolymer of ethylene and methacrylic acid (90/10) 70% neutralized with zinc ions.

In all the cases described above where the mineral reinforced compositions contain small amounts of the ionomer copolymer as well as a fibrillar fluoropolymer, the compositions were blowmoldable. In the absence of the fluoropolymer or ionomeric copolymer, the formulations were not blowmoldable.

I claim:

1. A composition consisting essentially of semicrystalline polyamide of number average molecular weight between about 10,000 and 25,000; 15-50 weight percent mineral filler reinforcing agent; 1-25 weight percent of an ionic copolymer of at least one alpha-olefin and at least one alpha, beta-unsaturated carboxylic acid, in which the acid moiety is partially neutralized with metal ions; and 0.1 to 3 weight percent fibrillar non-melt-fabricable fluoropolymer resin, wherein the percents are by weight based on the total weight of the above-listed ingredients.

2. The composition of claim 1 wherein the polyamide is nylon 66.

3. The composition of claim 1 wherein the reinforcing agent is aluminum silicate clay.

4. The composition of claim 2 wherein the reinforcing agent is aluminum silicate clay.

* * * * *